(12) United States Patent
Narumi et al.

(10) Patent No.: US 10,997,861 B2
(45) Date of Patent: May 4, 2021

(54) LUMINANCE CONTROL DEVICE, LUMINANCE CONTROL SYSTEM, AND LUMINANCE CONTROL METHOD

(71) Applicant: KABUSHIKI KAISHA TOKAI RIKA DENKI SEISAKUSHO, Aichi (JP)

(72) Inventors: Kenji Narumi, Aichi (JP); Shuichi Takeuchi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 198 days.

(21) Appl. No.: 16/333,812

(22) PCT Filed: Aug. 8, 2017

(86) PCT No.: PCT/JP2017/028769
§ 371 (c)(1),
(2) Date: Mar. 15, 2019

(87) PCT Pub. No.: WO2018/051685
PCT Pub. Date: Mar. 22, 2018

(65) Prior Publication Data
US 2019/0259279 A1    Aug. 22, 2019

(30) Foreign Application Priority Data

Sep. 16, 2016    (JP) .............................. JP2016-181870

(51) Int. Cl.
*G08G 1/16*    (2006.01)
*G06T 7/00*    (2017.01)
(Continued)

(52) U.S. Cl.
CPC ................. *G08G 1/16* (2013.01); *B60R 1/00* (2013.01); *B60R 1/06* (2013.01); *B60R 11/04* (2013.01); *H04N 7/18* (2013.01)

(58) Field of Classification Search
CPC .... G08G 1/16; G06T 7/00; B60J 3/04; G09G 5/00; B60Q 1/08; F41A 33/02;
(Continued)

(56) References Cited

U.S. PATENT DOCUMENTS

2004/0165284 A1*    8/2004    Holler ................ G02B 27/0172
359/805
2005/0181335 A1*    8/2005    Lvovskiy ................ F41A 33/02
434/16
(Continued)

FOREIGN PATENT DOCUMENTS

JP    2003260933 A  *  9/2003    ................ B60J 3/04
JP    2008170785 A  *  7/2008    ................ G09G 5/00
(Continued)

*Primary Examiner* — Yuri Kan
(74) *Attorney, Agent, or Firm* — Greenblum & Bernstein, P.L.C.

(57) ABSTRACT

A luminance control device includes a measurement unit configured to measure a pupil diameter of a driver based on an image in which a driver's face is imaged, a luminance estimation unit configured to estimate luminance of light incident on a pupil of the driver based on the image, a pupil diameter estimation unit configured to estimate a pupil diameter with respect to the luminance estimated, a pupil diameter difference calculation unit configured to calculate a pupil diameter difference between the measured pupil diameter and the estimated pupil diameter, and a controller configured to output control information for controlling a control subject so that luminance is increased in at least one display region in which an image of surroundings of a vehicle taken by at least one image device is displayed, when it is determined that a dim portion is being focused on, based on the pupil diameter difference.

15 Claims, 5 Drawing Sheets

(51) Int. Cl.
*G09G 5/00* (2006.01)
*B60R 1/06* (2006.01)
*B60R 11/04* (2006.01)
*B60R 1/00* (2006.01)
*H04N 7/18* (2006.01)

(58) Field of Classification Search
CPC ......... G02B 27/0172; H04L 7/00; A61B 5/18; G06K 9/46
See application file for complete search history.

(56) References Cited

U.S. PATENT DOCUMENTS

| | | | | |
|---|---|---|---|---|
| 2014/0341589 | A1* | 11/2014 | Schmid | H04B 10/116 398/131 |
| 2017/0032214 | A1* | 2/2017 | Krenzer | G06T 7/77 |
| 2018/0333092 | A1* | 11/2018 | Roshan | A61B 5/18 |

FOREIGN PATENT DOCUMENTS

| | | | | |
|---|---|---|---|---|
| JP | 2009113622 A | * | 5/2009 | ............... B60Q 1/08 |
| JP | 2012-227605 A | | 11/2012 | |
| KR | 101469978 B1 | * | 12/2014 | ............... G06T 7/00 |

\* cited by examiner

LUMINANCE CONTROL DEVICE, LUMINANCE CONTROL SYSTEM, AND LUMINANCE CONTROL METHOD

CROSS-REFERENCE TO RELATED APPLICATIONS

This application claims the priority right of Japanese patent application No. 2016-181870, the entire contents of which are incorporated herein by reference.

TECHNICAL FIELD

The present invention relates to a luminance control device, a luminance control system, and a luminance control method.

BACKGROUND ART

A peripheral monitor device including a presenting means for taking the image of surroundings of a vehicle and presenting the taken image to a driver, an obtaining means for obtaining the operation timing of the driving operation by the driver when using the presenting means, and a correcting means for correcting the image presented to the driver by the presenting means in accordance with the operation timing obtained by the obtaining means, is known (refer to Patent Document 1, for example).

In this peripheral monitor device, the image presented to the driver is corrected according to the operation timing of the driving operation by the driver when using the presenting means.

Accordingly, in the peripheral monitor device, the sense of distance and the sense of speed perceived by the driver are also corrected in consideration of the operation timing of the driver, so that the discomfort with respect to the sense of distance or speed can be reduced.

CITATION LIST

Patent Document

Patent Document 1: JP 2012-227605A

SUMMARY OF INVENTION

Technical Problem

The peripheral monitor device disclosed in Patent Document 1 has a possibility to cause the occurrence of a blackout that makes it difficult for the driver to recognize the presented image, when the luminance of a taken image is low.

An object of the present invention is to provide a luminance control device, a luminance control system, and a luminance control method capable of displaying an easily recognizable image.

Solution to Problem

A luminance control device according to an embodiment of the present invention includes: a measurement unit configured to measure a pupil diameter of a driver based on an image of a driver's face; a luminance estimation unit configured to estimate the luminance of light incident on the pupil of the driver based on the image; a pupil diameter estimation unit configured to estimate a pupil diameter with respect to the luminance estimated according to a luminance correspondence relationship in which luminance is associated with a pupil diameter; a pupil diameter difference calculation unit configured to calculate a pupil diameter difference that is a difference between the pupil diameter measured by the measurement unit and the pupil diameter estimated by the pupil diameter estimation unit; and a controller configured to output control information for controlling a control subject so that the luminance is increased in at least one display region in which an image of surroundings of a vehicle taken by at least one image device is displayed, when it is determined that a dim portion is being focused on, based on the pupil diameter difference.

Advantageous Effects of Invention

According to an embodiment of the present invention, a luminance control device, a luminance control system, and a luminance control method capable of displaying an easily recognizable image may be provided.

DESCRIPTION OF EMBODIMENTS

Overview of Embodiments

A luminance control device according to an embodiment includes:
a measurement unit configured to measure a pupil diameter of a driver based on an image of the driver's face; a luminance estimation unit configured to estimate the luminance of light incident on the pupil of the driver based on the image; a pupil diameter estimation unit configured to estimate a pupil diameter with respect to the luminance estimated according to a luminance correspondence relationship in which luminance is associated with a pupil diameter; a pupil diameter difference calculation unit configured to calculate a pupil diameter difference that is a difference between the pupil diameter measured by the measurement unit and the pupil diameter estimated by the pupil diameter estimation unit; and a controller configured to output control information for controlling a control subject so that the luminance is increased in at least one display region in which an image of surroundings of a vehicle taken by at least one image device is displayed, when it is determined that a dim portion is being focused on, based on the pupil diameter difference.

Since a luminance control device controls the luminance of a control subject to suppress the pupil diameter difference, an easily recognizable image is displayed by controlling luminance so as to have appropriate luminance, even when the luminance of a display region being focused on by a driver is low, than would otherwise be the case.

Embodiment (Overview of Luminance Control Device 1)

Figure 1A:
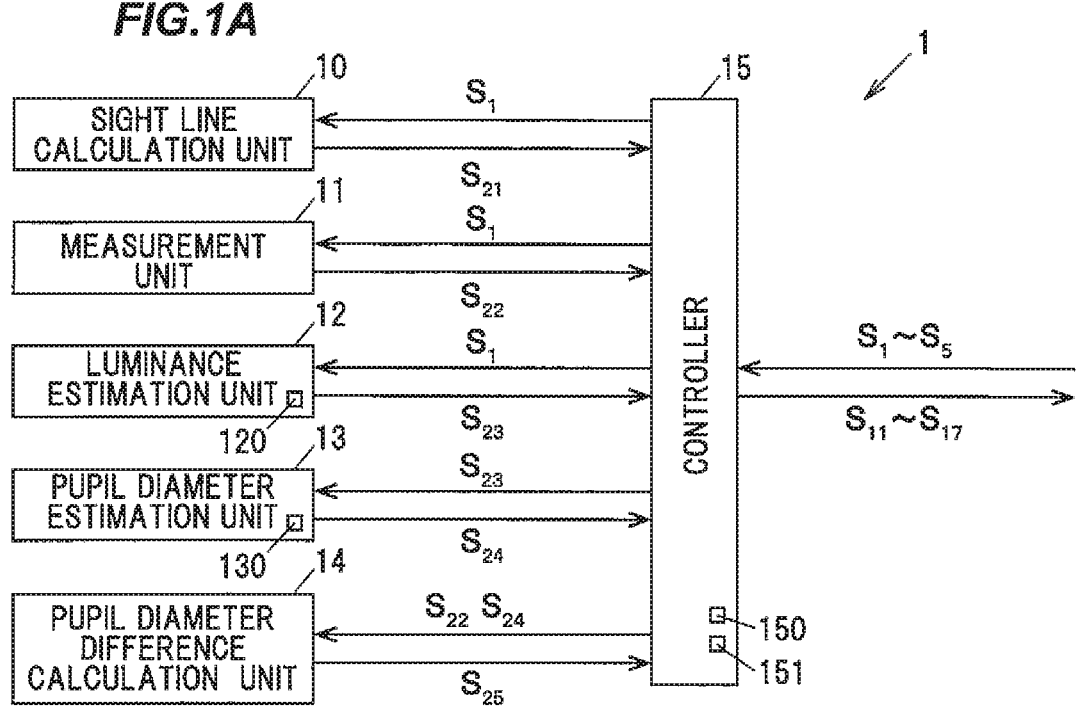
FIG. 1A is a block diagram illustrating a luminance control device according to an embodiment.
Figure 1B:
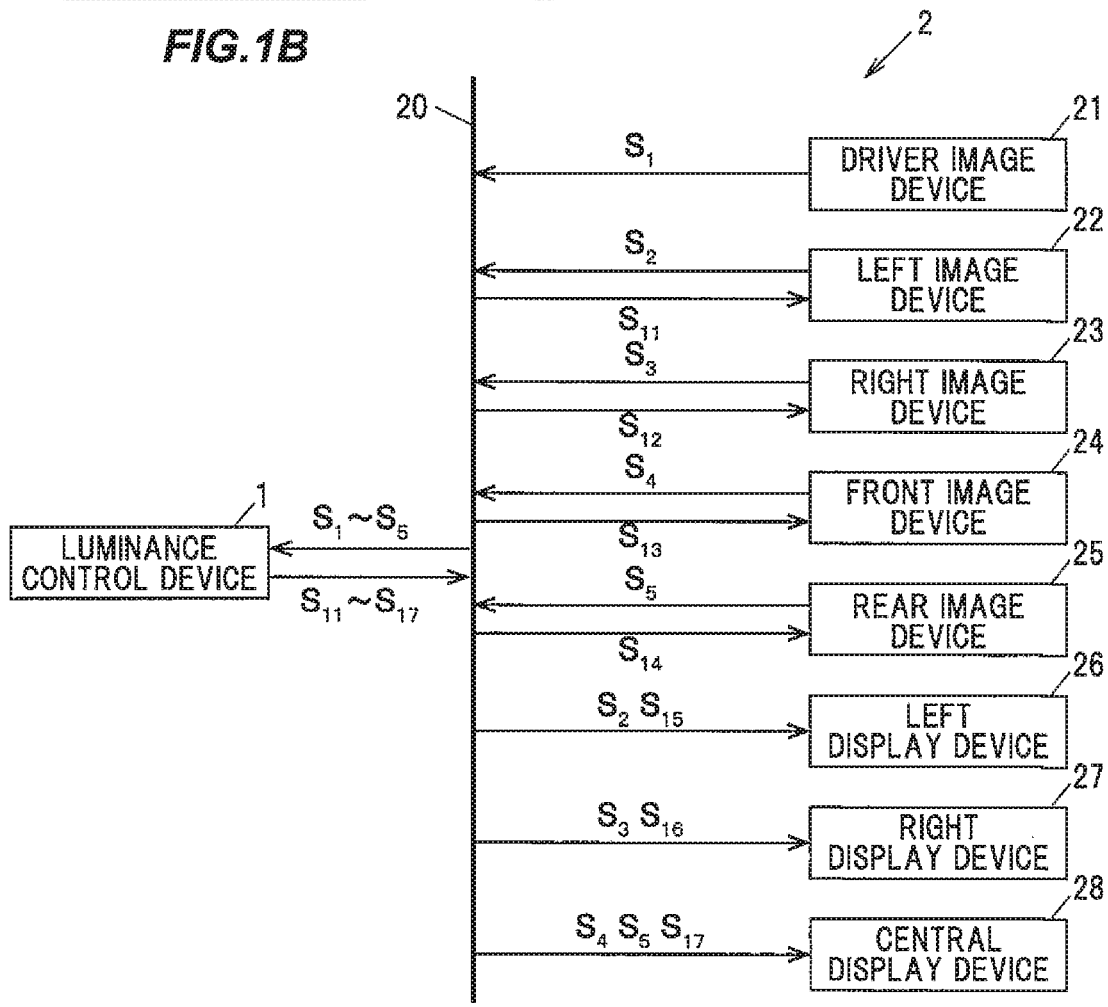
FIG. 1B is a block diagram illustrating a luminance control system including the luminance control device.
Figure 2A:
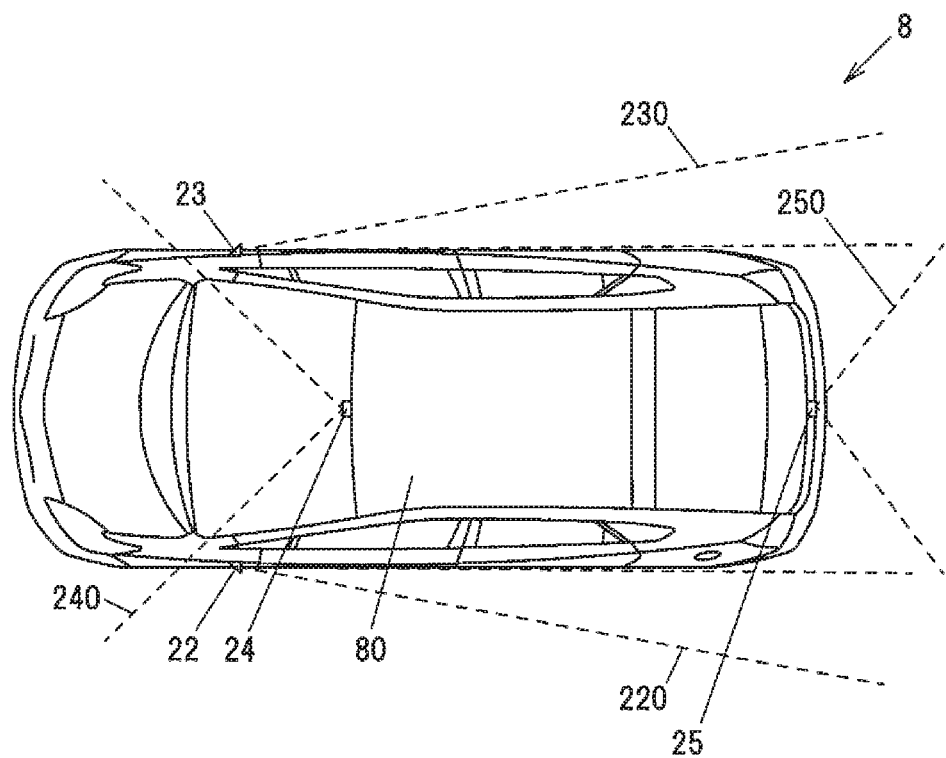
FIG. 2A is an explanatory diagram illustrating a vehicle in which a luminance control device is mounted according to an embodiment.
Figure 2B:
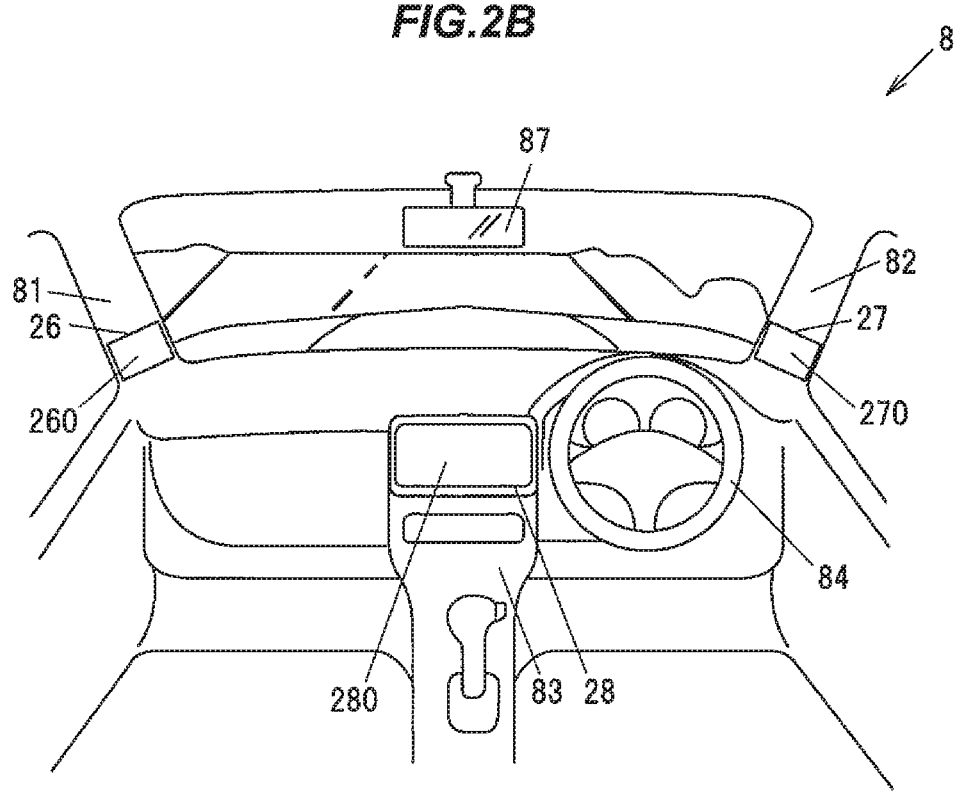
FIG. 2B is an explanatory diagram illustrating an interior of the vehicle.
Figure 3A:
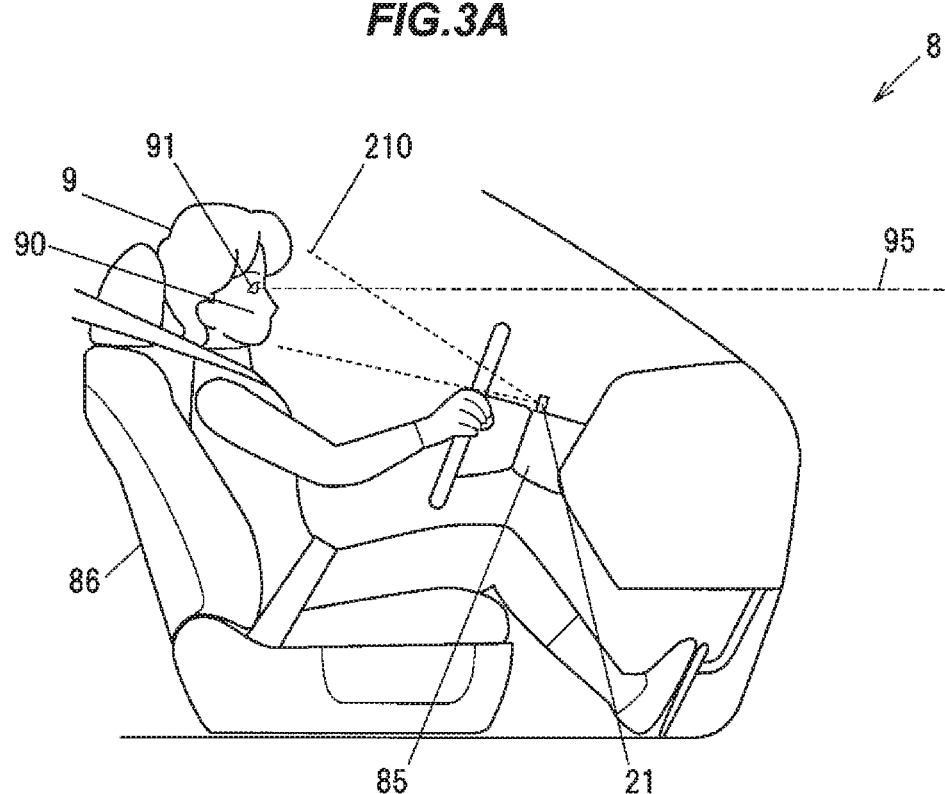
FIG. 3A is an explanatory diagram illustrating an arrangement of a driver image device and the like of the luminance control device according to an embodiment.
Figure 3B:
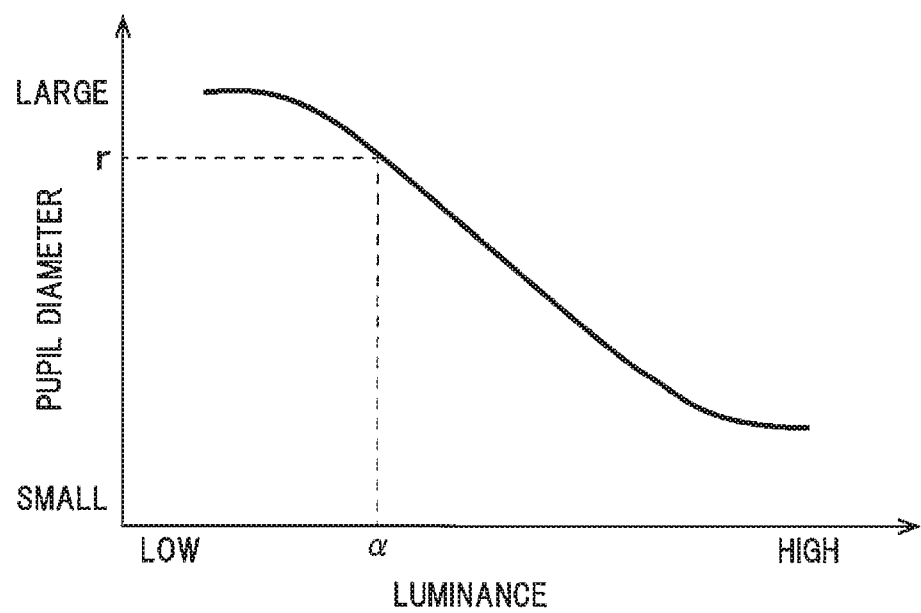
FIG. 3B is a graph illustrating correspondence between luminance and the pupil diameters.

FIG. 1A is a block diagram illustrating a luminance control device according to an embodiment, and FIG. 1B is a block diagram illustrating a luminance control system including the luminance control device. FIG. 2A is an explanatory diagram illustrating a vehicle in which a luminance control device is mounted according to an embodiment, and FIG. 2B is an explanatory diagram illustrating an interior of the vehicle. FIG. 3A is an explanatory diagram illustrating an arrangement of a driver image device and the like of the luminance control device according to an embodiment, and FIG. 3B is a graph illustrating the correspondence between luminance and the pupil diameters. In FIG. 3B, the vertical axis is the pupil diameter and the horizontal axis is the luminance. In each of the drawings according to the embodiments to be described below, the scale between figures may be different from the actual scale. In FIGS. 1A and 1B, the arrows indicate the flow of main information.

As shown in 1A, the luminance control device 1 includes a sight line calculation unit 10, a measurement unit 11, a luminance estimation unit 12, a pupil diameter estimation unit 13, a pupil diameter difference calculation unit 14, and a controller 15. This luminance control device 1 is, for example, configured to mainly control the luminance of images taken by a left image device 22 and a right image device 23 of a vehicle 8, as shown in FIG. 2A. The left image device 22 and the right image device 23 constitute a part of an electronic mirror device of the vehicle 8.

The luminance control device 1 also constitutes a part of a luminance control system 2 along with the left image device 22 and the right image device 23, as shown in FIG. 1B. This luminance control system 2 is an example of an electronic mirror device.

A configuration of the luminance control device 1 will be described specifically below.

(Configuration of Sight Line Calculation Unit 10)

Figure 4A:
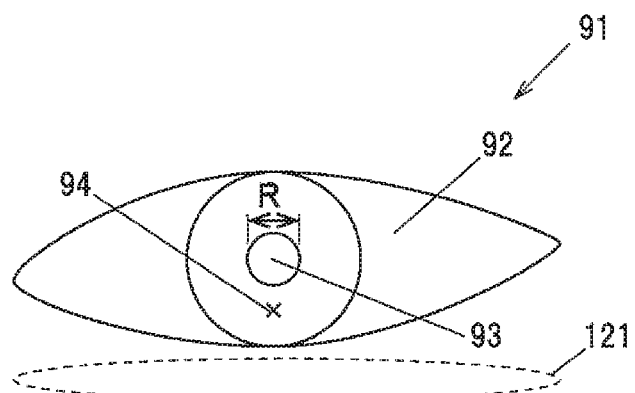
FIG. 4A is an explanatory diagram illustrating a periphery of an eyeball for explaining a sight line calculation by a luminance control device according to an embodiment.
Figure 4B:
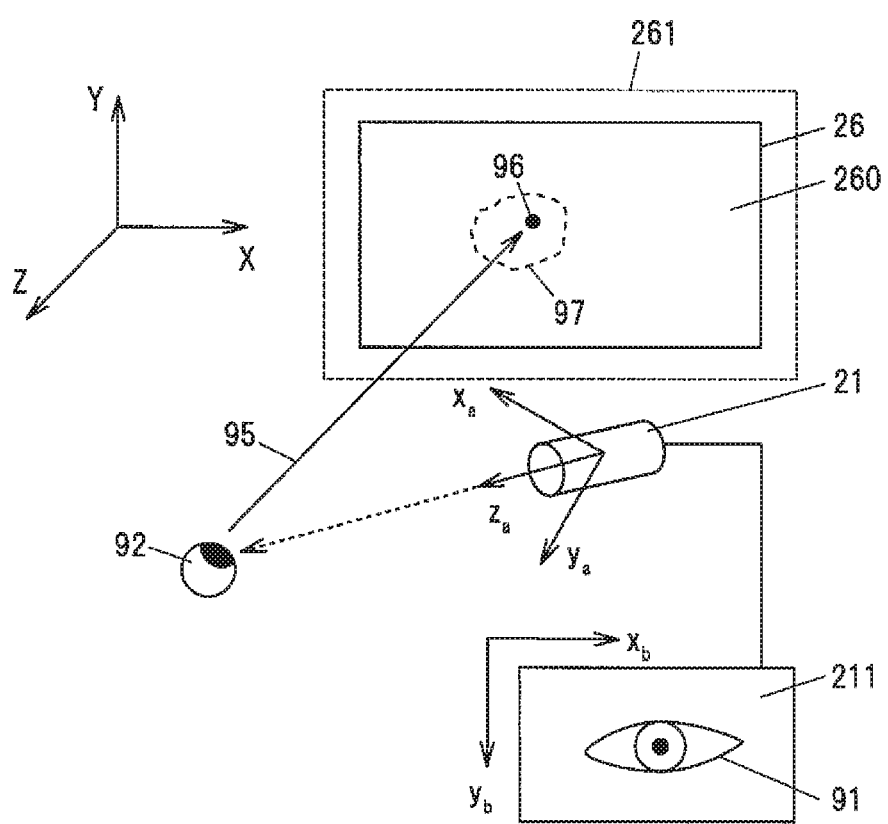
FIG. 4B is an explanatory diagram illustrating a system for explaining a sight line calculation.

FIG. 4A is an explanatory diagram illustrating a periphery of an eyeball for explaining a sight line calculation by a luminance control device according to an embodiment, and FIG. 4B is an explanatory diagram illustrating a system for explaining a sight line calculation.

As shown in FIGS. 3A, 4A, and 4B, the sight line calculation unit 10 obtains an image 211 that imaged a periphery of an eye 91 of an driver 9 seated at a driver's seat 86, based on image information S1 output from a driver image device 21, and detects a viewing point 96, an intersection of the sight line 95 of the driver 9 and a display region 260, based on this image 211. The viewing point 96 is, as an example, an intersection of the display region 260 as a display screen of a left display device 26 shown in FIG. 2B and the sight line 95.

The sight line calculation unit 10 is, for example, configured to irradiate near infrared light on the eyeball 92, to calculate a viewing point 96, an intersection of the sight line 95 from the position of the reflected light (Purkinje image 94) on a corneal surface and pupil 93, with a plane 261 including the display region 260 of the left display device 26. The sight line calculation unit 10 segments the obtained image 211 into regions, each of which has similar luminance, and determines the pupil region among the segmented regions by the segment shape using a pattern matching method or the like.

Then, the sight line calculation unit 10 obtains the center of the ellipse from a contour set of the pupil 93 to detect the Purkinje image 94 within a certain range from the center of this ellipse as a target. Next, the sight line calculation unit 10 calculates the sight line 95 from the obtained pupil 93 and the Purkinje image 94.

In the image coordinate system (XbYb coordinate system) shown in FIG. 4B, for example, coordinates of the image coordinate system can be transformed to coordinates of the world coordinate system. In addition, the sight line calculation unit 10 calculates coordinates of the corneal curvature center and the pupil center in the camera coordinate system (xayaza coordinate system) and performs a coordinate transformation for transforming each coordinate to coordinates of the world coordinate system to obtain the sight line vector in the world coordinate system.

The sight line calculation unit 10 obtains coordinates of the viewing point 96 on a plane 261 by projecting this sight line vector onto the plane 261. The method for calculating the sight line is not limited to the method using the Purkinje image 94 described above, but may use an estimation method based on the orientation of the pupil center, an estimation method based on the orientation of the face, a positional relationship between the corner of an eye (or the inner corner of an eye) and the center of the pupil, or other methods.

The sight line calculation unit 10 generates sight line information S21 related to coordinates of the viewing point 96, and outputs it to the controller 15. The controller 15 determines a display region at which the driver 9 is looking based on the calculated viewing point 96. The controller 15 also determines that none of the display regions is being looked at when the viewing point 96 is not calculated.

The sight line calculation unit 10 may display points and the like for each display region and make the driver 9 to view the points, to calibrate for each driver 9. As an example, this calibration is performed to correct an error in the sight line 95, and done when the driver 9 views the left display device 26 and the right display device 27 as a confirmation before driving, after getting in the vehicle 8 and the power is on.

(Configuration of Measurement Unit 11)

The measurement unit 11 is configured to measure a pupil diameter R of the driver 9 based on the image 211, as shown in FIGS. 4A and 4B. As an example, it is preferable, but not limited to, that the pupil diameter R is a diameter in the lateral direction of the page of FIG. 4A in consideration of the possible occurrence of a measurement error due to a shadow of the eyelid.

The pupil diameter R is measured, as an example, by extracting a region corresponding to the pupil 93 in the binarized image and measuring the width of the region based on the number of pixels in the region. The measurement unit 11 treats this width as the pupil diameter R. The method of measuring the pupil diameter R is not limited to this, but various methods are applicable.

The measurement unit 11 measures the pupil diameter R based on the image information S1 obtained from the driver image device 21 to generate measurement information S22, and outputs it to the controller 15.

(Configuration of Luminance Estimation Unit 12)

The luminance estimation unit 12 is configured to estimate the luminance of light incident on the pupil 93 of the driver 9 based on the image 211. Specifically, the luminance estimation unit 12 estimates the luminance α of light incident on the pupil 93 of the driver 9 based on the luminance on the periphery of the eye 91 of the driver 9. As an example, the periphery of the eye 91 is a region 121 around the eye bag underneath the eye 91, as shown in FIG. 4A.

This measurement of the luminance is performed, for example, using a correspondence table 120. As an example, the correspondence table 120 is prepared in advance by measuring the luminance of the illuminated subject with a luminance meter and imaging the subject, then associating the measured luminance with the gradation of the image. The luminance estimation unit 12 estimates luminance α based on the gradation of the area 121 and the correspondence table 120. The method of estimating the luminance α is not limited to this, but a method using a function or the like may be applied.

The luminance estimation unit 12 estimates the luminance α based on the image information S1 obtained from the driver image device 21, to generates luminance estimation information S23 based on the estimated luminance α, and outputs it to the controller 15.

(Configuration of Pupil Diameter Estimation Unit 13)

The pupil diameter estimation unit 13 has a luminance table 130 in which luminance α is associated with the pupil diameter r, and is configured to estimate the pupil diameter r with respect to the luminance α by comparing the estimated luminance α and the luminance table 130.

As for luminance and pupil diameters, as an example, it is known that a pupil diameter decreases as luminance increases, and a pupil diameter increases as luminance decreases, as shown in the graph of FIG. 3B. The luminance table 130 is an example of a luminance corresponding relationship in which luminance is associated with the pupil diameter. The pupil diameter estimation unit 13 extracts the pupil diameter r corresponding to the estimated luminance α from the luminance table 130. Then, the pupil diameter estimation unit 13 generates pupil diameter estimation information S24 based on the estimated pupil diameter r and outputs it to the controller 15. The method of estimating the pupil diameter r may be, for example, an estimation method using a function or the like.

As a modified example, the pupil diameter estimation unit 13 may be configured to measure the pupil diameter for each driver to create a luminance corresponding relationship, and to estimate the pupil diameter r for each driver. In this case, the identification of the driver is performed by using, for example, biological information or an electronic key. This biological information is, for example, a fingerprint, a vein or the like. As an example, biometric information is obtained by a sensor provided in the steering 84. As another modified example, the luminance correspondence relationship may be created for each age or race, for example.

Further, the pupil diameter estimation unit 13 may estimate the pupil diameter r for each attribute of the driver. For example, this attribute is defined by age or race.

(Configuration of Pupil Difference Calculation Unit 14)

The pupil diameter difference calculation unit 14 is configured to calculates a pupil diameter difference, that is the difference (=R−r) between the pupil diameter R measured by the measurement unit 11 and the pupil diameter r estimated by the pupil diameter estimation unit 13.

The pupil diameter r estimated by the pupil diameter estimation unit 13 is, for example, obtained by estimating the pupil diameter from luminance when visually recognizing an object illuminated by light from the outside of the vehicle 8 or illumination in the vehicle 8 or the like. On the other hand, the pupil diameter R measured by the measurement unit 11 is the pupil diameter measured from the taken image 211, which is close to the actual pupil diameter.

When the driver 9 looks at a luminous place close to the luminance of the surroundings, the pupil diameter difference between the measured pupil diameter R and the estimated pupil diameter r becomes small.

However, for example, when the driver 9 looks at a dimmer place than the surroundings, the pupil diameter increases to try to capture a small amount of light. That is, the pupil diameter becomes larger when looking at a dimmer place than the surroundings, when compared with looking at the surroundings, so that the pupil diameter R measured by the measurement unit 11 becomes larger than the estimated pupil diameter r.

For example, when the driver 9 views the display region 260 of the left display device 26, the difference in pupil diameter between the measured pupil diameter R and the estimated pupil diameter r is small, if an image is displayed in the display region 260 with appropriate luminance. On the other hand, when the displayed image is dim, the measured pupil diameter R becomes greater than the estimated pupil diameter r. That is, there is a high possibility of the driver looking at a dim place, when the pupil diameter difference is large.

The pupil diameter difference calculation unit 14 subtracts the estimated pupil diameter r from the measured pupil diameter R to generate pupil diameter difference information S25, and outputs it to the controller 15.

(Configuration of Controller 15)

For example, the controller 15 is a microcomputer including a CPU (Central Processing Unit) that computes and processes acquired data according to stored programs, and RAM (Random Access Memory) and ROM (Read Only Memory) that are semiconductor memories. In this ROM, for example, a program for operating the controller 15, a determination threshold value 150, a control table 151, and the like are stored. The RAM is used, for example, as a storage area for temporarily storing calculation results and the like.

The controller 15 is configured to output control information for controlling the control subject, so that the luminance of the display region in which the sight line 95 intersects is increased to suppress the pupil diameter difference, when it is determined that the sight line 95 intersects with any one of the plurality of display regions in which an image of surroundings of the vehicle 8 taken by the plurality of image devices is displayed, and that the display region in which the sight line 95 intersects is being focused on, based on the pupil diameter difference.

In an electronic mirror device, the plurality of image devices are the left image device 22 and the right image device 23. Also in the electronic mirror device, as an example, the plurality of display regions are the display region 260 of the left display device 26 and the display region 270 of the right display device 27, as shown in FIG. 2B.

Also, the controller 15 may control the display device having the display region in which the sight line 95 intersects as the control subject so that the luminance is increased, may control the image device for taking an image displayed in the display region in which the sight line 95 intersects as the control subject so that the luminance is increased, or may control both the display device and the image device as the control subject. In other words, when the luminance of the display region is low, the controller 15 may control the luminance of the display region itself to be increased, may control a diaphragm and the like of the image device so that the luminance for the taken image is increased so as to have an appropriate luminance, or may control both of them in combination.

The determination threshold value 150 is a threshold value related to the pupil diameter difference. This determination threshold value 150 is, as an example, 0.5 mm. The determination threshold value 150 is set from, for example, the difference in pupil diameter between the pupil diameter when looking at the surroundings and the pupil diameter when looking at a dimmer portion than the surroundings, and is defined by experiments or simulations. As an example, when the pupil diameter difference is equal to or more than 0.5 mm, the controller 15 determines that a dimmer portion than the surroundings is being looked at. The dimmer portion is a space recognized as being dimmer than the surroundings, and is, for example, a space in which the luminance is equal to or less than a predefined threshold value for the luminance of the surroundings.

The control table 151 is a table for generating control information for controlling the control subject. The control table 151 stores the pupil diameter difference and the control information of the control subject with associating each other. After obtaining the pupil diameter difference and determining the control subject, the controller 15 extracts the control information for the control subject based on the pupil diameter difference and the control table 151. Then, the controller 15 outputs the control information.

The controller 15 determines the control subject based on the sight line information S21. Specifically, when the viewing point 96 exists, that is, when a display region in which the sight line 95 intersects exists, the controller 15 controls at least one of the image device for taking the image displayed in the display region and the display device having the display region.

When controlling the left image device 22, the controller 15 outputs the control information S11. When controlling the right image device 23, the controller 15 outputs the control information S12.

Then, when controlling the left display device 26, the controller 15 outputs control information S15. Furthermore, when controlling the right display device 27, the controller 15 outputs control information S16.

Subsequently, the luminance control system 2 will be described below.
(Configuration of Luminance Control System 2)

As an example, the luminance control system 2 includes, a luminance control device 1, a driver image device 21 for imaging a face 90 of a driver 9, a plurality of image devices for imaging surroundings of a vehicle 8, and at least one display device having a plurality of display regions for displaying images taken by the plurality of image devices, as shown in FIG. 1B.

For example, the driver image device 21 is arranged on a steering column 85 and is configured to image the image range 210 to output the image information S1, as shown in FIG. 3A. This driver image device 21 is, for example, an image device using a solid-state image device such as a CCD image sensor (Charge Coupled Device), a CMOS (Complementary Metal Oxide Semiconductor) image sensor. The arrangement of the driver image device 21 is not limited to on the steering column 85, and may be on anywhere the driver's face can be imaged.

Also, a plurality of image devices of the present embodiment are a left image device 22 and a right image device 23, as described above. A left image device 22 is arranged on the left side surface of a vehicle body 80 of the vehicle 8 as shown in FIG. 2A, and images an image range 220, the rear left of the vehicle body 80, and outputs image information S2, Also, a right image device 23 is arranged on the right side surface of the vehicle body 80, and images an image range 230, the rear right side of the vehicle body 80, and outputs image information S3.

The left image device 22 and the right image device 23 are image devices, for example, using solid-state image devices such as CCD image sensors, CMOS image sensors.

Further, a plurality of display regions of the present embodiment are a display region 260 of the left display device 26 and a display region 270 of the right display device 27, as shown in FIG. 2B. As an example, the left display device 26 is arranged on a left pillar 81 of the vehicle 8. As an example, the right display device 27 is disposed on a right pillar 82. These left display device 26 and the right display device 27 are, for example, liquid crystal monitors.

The left display device 26, for example, displays an image based on the image information S2 obtained from the left image device 22, in the display region 260. Also, the right display device 27, for example, displays an image based on the image information S3 obtained from the right image device 23, in the display region 270.

In the display region 260 and the display region 270, a room mirror 87 of the vehicle 8 may be configured as a liquid crystal monitor, and at least a part of the display region of the liquid crystal monitor may be divided to be allocated to the left and right areas. Also, the display region 260 and the display region 270 may be divided into left and right regions from the display region 280 of the central display device 28.

In this luminance control system 2, the luminance control device 1 and the driver image device 21 and the like are electromagnetically connected via a vehicle LAN (Local Area Network) 20 to exchange signals and information.

Figure 5:
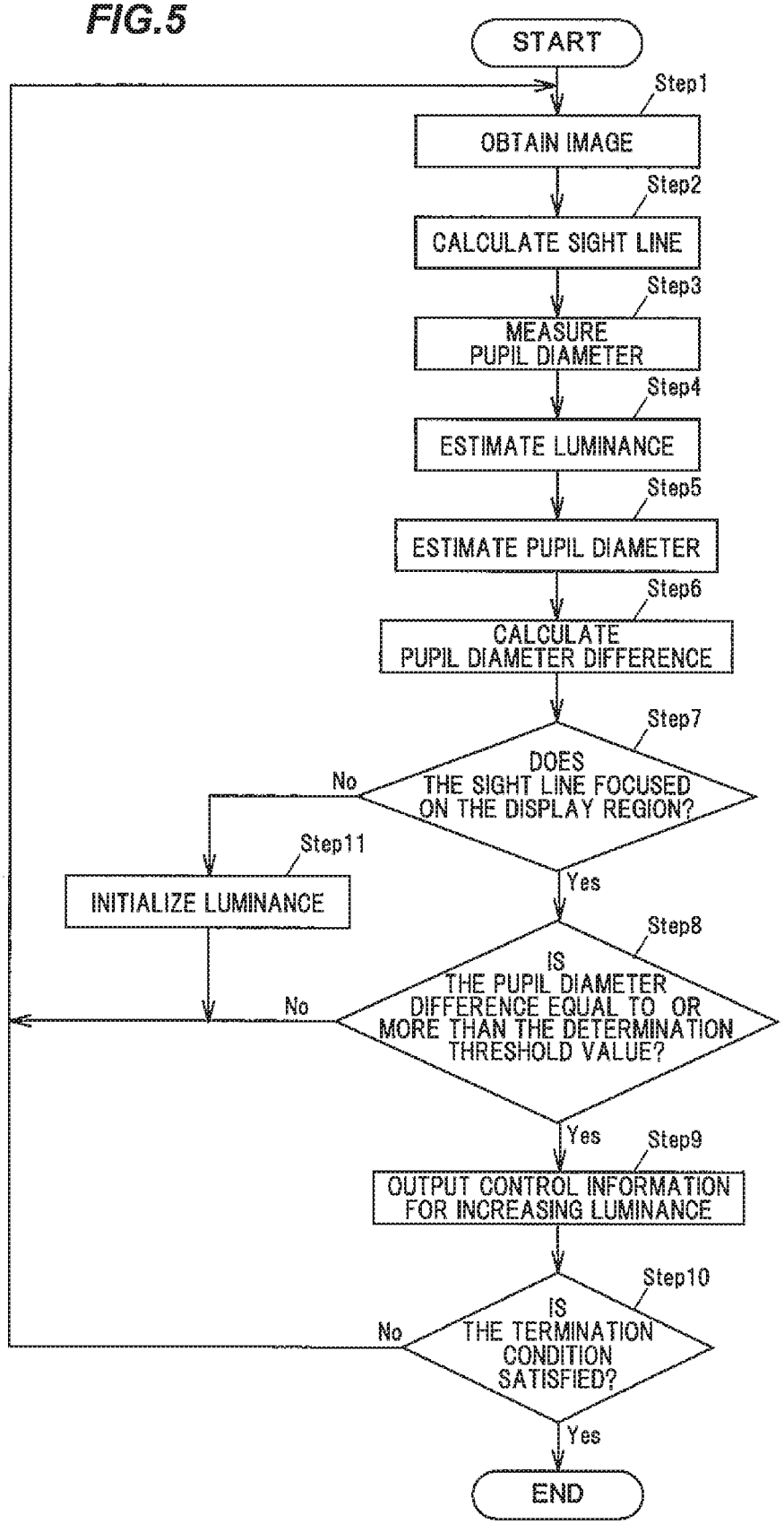
FIG. 5 is a flowchart illustrating an operation based on a luminance control method performed by a luminance control device according to an embodiment.

An example of the operation of the luminance control device 1 of the present embodiment will be described below, with reference to the flowchart of FIG. 5.
Operation The luminance control device 1 performs a method of controlling luminance, including: obtaining the image 211 in which the face 90 of the driver 9 is imaged, calculating the sight line 95 of the driver 9 based on the obtained image 211, measuring a pupil diameter R of the driver 9 based on the image 211, estimating the luminance α of light incident on the pupil 93 of the driver 9 based on the image 211, estimating a pupil diameter r with respect to luminance α estimated by comparing the estimated luminance α with the luminance table 130 in which luminance is associated with a pupil diameter, calculating a pupil diameter difference, the difference between the pupil diameter R measured by the measurement unit 11 and the pupil diameter r estimated by the pupil diameter estimation unit 13, and outputting control information for controlling a control subject so that the luminance of the display region in which the sight line 95 intersects is increased to suppress the pupil diameter difference, when it is determined that the sight line 95 intersects with any one of the plurality of display regions (display region 260 and display region 270) in which images of surroundings of a vehicle 8 taken by the plurality of image devices (left image device 22 and right image device 23) are displayed, and that the display region in which the sight line 95 intersects is being focused on, based on the pupil diameter difference.

First, the controller 15 of the luminance control device 1 obtains the image 211 in which the face 90 of the driver 9 is imaged (Step 1). This image 211 is an image based on the image information S1 obtained from the driver image device 21 via the vehicle LAN 20.

Next, the sight line calculation unit 10 calculates the sight line 95 of the driver 9 based on the obtained image 211 (Step 2). The sight line calculation unit 10 obtains the image information S1 via the controller 15 to calculate the sight line 95. Then, the sight line calculation unit 10 outputs the sight line information S21 based on the calculated sight line 95 to the controller 15.

Next, the measurement unit 11 measures the pupil diameter R of the driver 9 based on the image 211 (Step 3). The measurement unit 11 obtains the image information S1 via the controller 15 to measure the pupil diameter R. The measurement unit 11 outputs measurement information S22 based on the calculated pupil diameter R to the controller 15.

Next, the luminance estimation unit 12 estimates the luminance of the light incident on the pupil 93 of the driver 9 based on the image 211 (Step 4). The luminance estimation unit 12 estimates luminance based on the image 211 based on the image information S1 obtained via the controller 15, and the correspondence table 120. The luminance estimation unit 12 generates luminance estimation information S23 based on the estimated luminance $\alpha$, and outputs it to the controller 15.

Next, the pupil diameter estimation unit 13 estimates the pupil diameter r with respect to the luminance $\alpha$ estimated by comparing the estimated luminance $\alpha$ with the luminance table 130 in which the luminance is associated with the pupil diameter (Step 5). The pupil diameter estimating unit 13 estimates the pupil diameter by comparing the luminance $\alpha$ estimated based on the luminance estimation information S23 obtained via the controller 15 with the luminance table 130. Then, the pupil diameter estimation unit 13 generates the pupil diameter estimation information S24 based on the estimated pupil diameter r, and outputs it to the controller 15.

Next, the pupil diameter difference calculation unit 14 calculates a pupil diameter difference, that is the difference between the pupil diameter R measured by the measurement unit 11 and the pupil diameter r estimated by the pupil diameter estimation unit 13 (Step 6). Specifically, the pupil diameter difference calculation unit 14 obtains the measurement information S22 and the pupil diameter estimation information S24 via the controller 15, to calculate the pupil diameter difference. The pupil diameter difference calculation unit 14 generates the pupil diameter difference information S25 based on the calculated pupil diameter difference, and outputs it to the controller 15.

Next, the controller 15 determines whether the sight line 95 intersects with any of the display region 260 or the display region 270, in which images of surroundings of the vehicle 8 taken by the left image device 22 and the right image device 23 are displayed. When it is determined that the sight line 95 intersects with either of the display region 260 or the display region 270 based on the sight line information S21 (Step 7: Yes), subsequently the controller 15 determines whether the display region in which the sight line 95 intersects is being focused on, based on the pupil diameter difference.

Next, the controller 15 compares the pupil diameter difference based on the obtained pupil diameter difference information S25 with the determination threshold value 150, and then, determines that the display region in which the sight line 95 intersects is being focused on, that is, the dim portion is being focused on, when the pupil diameter difference is equal to or more than the determination threshold value 150 (Step 8: Yes).

Next, the controller 15 outputs control information for controlling the control subject, so that the luminance in the display region in which the sight line 95 intersects is increased to suppress the pupil diameter difference (Step 9). Specifically, for example, when controlling the left display device 26 or the right display device 27, the controller 15 generates the control information S15 or the control information S16 based on the pupil diameter difference, and the control table 151, and output them to the corresponding left display device 26 or right display device 27 via the vehicle LAN 20. The left display device 26 or the right display device 27 displays an image with high luminance in the display region based on the obtained control information.

Also, for example, when controlling the left image device 22 or the right image device 23, the controller 15 generates the control information S15 or the control information S16 based on the pupil diameter difference and the control table 151, and output them to the corresponding left image device 22 or the right image device 23 via the vehicle LAN 20. The left image device 22 or the right image device 23 images the image with high luminance to generate image information, and outputs it to the corresponding left display device 26 or right display device 27 via the vehicle LAN 20.

Here, as a modified example, when the left display device 26 and the right display device 27 are configured to be capable of correcting the displaying images, the controller 15 may correct the image information S2 and the image information S3 to generate the image information corresponded to the image with high luminance, and output it to the corresponding display device. The display device obtains the corrected image information and displays an image with high luminance in the display region.

Next, when the termination condition is satisfied (Step 10: Yes), the controller 15 terminates the operation. This termination condition is, for example, that the ignition switch of the vehicle 8 is turned off, or that the switch for instructing to turn on/off this luminance control device 1 is operated to turn off, and the like.

In step 7, when it is determined that the sight line 95 does not intersect with neither of the display regions (Step 7: No), the controller 15 initializes the luminance (Step 11). Specifically, the controller 15 controls at least either of the display devices and the image devices, which are control subjects, to restore the luminance to the initial value. The controller 15 may control the luminance to be restored the level before increasing luminance, for example.

In step 8, when the pupil diameter difference is less than the determination threshold value 150 (step 8: No), the controller 15 determines that the luminance is appropriate and proceeds to step 1 to obtain the next image 211.

In step 10, when the termination condition is not satisfied (step 10: No), the controller 15 proceeds to step 1 to obtain the next image 211.

The order of at least Step 2 to Step 5 may be changed to a different order. Also, the order of steps 7 and 8 may be reversed. Further, step 7 may be omitted.

Here, as a modified example, the controller 15 may be configured to perform a feedback control until the pupil diameter difference falls within a targeted range. This feedback control is, for example, a control of repeating the calculation of the pupil diameter difference, the output of control information, and the like, so that the pupil diameter difference falls within a targeted range.

Effect of Embodiments

The luminance control device 1 according to the present embodiment can display a easily recognizable image. Specifically, the luminance control device 1 calculates a pupil diameter difference, the difference between the measured pupil diameter R and the estimated pupil diameter r, based on the luminance of the surroundings. Since the luminance control device 1 can increase the luminance of the display region when this pupil diameter difference indicates that the dim portion is being focused on, an easier recognizable image for the driver than would otherwise be the case may be displayed.

Since the luminance control device 1 controls the luminance of the control subject to suppress the pupil diameter difference, an easier recognizable image than would otherwise be the case may be displayed, by controlling so as to have appropriate luminance, even when the luminance of the display region being focused on by the driver is low.

Since the luminance control device 1 can increase the luminance of the image, is possible for the driver to visually recognize the dim portion easily in a subject with a wide luminance dynamic range.

Since the luminance control device 1 can control the diaphragm and the like of the image device to generate an image with high luminance, an image with the higher S/N ratio than would otherwise be the case may be taken, even when imaging a dim place.

Since the luminance control device 1 controls the display device and the image device according to the pupil diameter difference, an image with more appropriate luminance than would otherwise be the case may be displayed.

Here, as another embodiment, the luminance control device 1 may be configured to perform a method of controlling luminance, including:

measuring a pupil diameter R of a driver 9 based on the image 211 where the face 90 of the driver 9 is imaged, estimating the luminance of light incident on the pupil 93 of the driver 9 based on the image 211, estimating a pupil diameter r with respect to luminance α estimated according to a luminance correspondence relationship in which luminance is associated with a pupil diameter, calculating a pupil diameter difference that is a difference between a measured pupil diameter R and an estimated pupil diameter r, and outputting control information for controlling a control subject so as to increase the luminance of at least one display region in which an image of surroundings of the vehicle 8 taken by at least one image device is displayed, when it is determined that a dim portion is being focused on, based on the pupil diameter difference.

As yet another embodiment, the luminance control system 2 may further include a front image device 24, a rear image device 25, and a central display device 28, as shown in FIG. 1B.

The front image device 24 and the rear image device 25 are image devices, for example, using solid-state image devices such as CCD image sensors, CMOS image sensors. The front image device 24 is arranged, for example, in the vehicle interior of the vehicle, to take images in an image range 240 in front of the vehicle 8, and outputs image information S4, as shown in FIG. 2A. The rear image device 25 is arranged, for example, on the rear side of the vehicle 8, to take images in an image range 250 behind the vehicle 8, and outputs image information S5.

As an example, images taken by the front image device 24 and the rear image device 25 are displayed on the display screen (display region 280) of the central display device 28 arranged on a center console 83. That is, the central display device 28 displays images based on the obtained image information S4 and the obtained image information S5. Accordingly, in this luminance control system 2, for example, surroundings of the vehicle 8 is displayed on the left display device 26, the right display device 27, and the central display device 28. This central display device 28 is, for example, a liquid crystal monitor.

The controller 15 outputs control information for controlling the control subject, so that the luminance is increased in the display region in which the sight line 95 intersects to suppress the pupil diameter difference, when it is determined that the sight line 95 intersects with any one of the plurality of display regions (display region 260, display region 270, and display region 280) in which images of surroundings of a vehicle 8 taken by the plurality of image devices (left image device 22, right image device 23, front image device 24, and rear image device 25) are displayed, and that the display region in which the sight line 95 intersects is being focused on, based on the pupil diameter difference.

For example, this control information is control information S13 when controlling the front image device 24, control information S14 when controlling the rear image device 25, and control information S17 when controlling the central display device 28, as shown in FIG. 1B.

Here, as a modified example, the luminance control device 1 may display the images of the left image device 22, the right image device 23, the front image device 24, and the rear image device 25, in a plurality of display regions set at the central display device 28. Also, the display device may be configured as a head-up display for displaying images on the front window of the vehicle 8, for example.

As yet another modification, the luminance control device 1 may be configured to increase the luminance of the low luminance region 97 including the viewing point 96 at which the sight line 95 intersects, as shown in FIG. 4B.

The luminance control device 1 according to the embodiment and modifications described above may, depending on the application, be partially realized as a program executed by a computer, an application specific integrated circuit (ASIC), a field programmable gate array (FPGA), and the like, for example.

Several embodiments and modifications of the present invention have been described above. However, these embodiments and modifications are merely examples and do not limit the invention according to the claims. These novel embodiments and modifications can be implemented in various other forms, and various omissions, substitutions, changes, and the like can be made without departing from the gist of the present invention. In addition, all of the combinations of features described in these embodiments and modifications are not necessarily essential to the means of solving the problem of the invention. Furthermore, these embodiments and modifications are included in the scope and the gist of the invention, and are included in the invention described in the claims and the scope of an equivalent thereof.

REFERENCE SIGNS LIST 1 luminance control device
2 luminance control system 8 vehicle
9 driver
10 sight line calculation unit
11 measurement unit
12 luminance estimation unit
13 pupil diameter estimation unit
14 pupil diameter difference calculation unit
15 controller
21 driver image device
90 face
93 pupil
95 sight line
97 low luminance region
260 display region

The invention claimed is:

1. A luminance control device, comprising:
   a measurement unit configured to measure a pupil diameter of a driver based on an image in which a driver's face is imaged;
   a luminance estimation unit configured to estimate luminance of light incident on a pupil of the driver based on the image;
   a pupil diameter estimation unit configured to estimate a pupil diameter with respect to the luminance estimated according to a luminance corresponding relationship in which luminance is associated with a pupil diameter;
   a pupil diameter difference calculation unit configured to calculate a pupil diameter difference that is a difference between the pupil diameter measured by the measurement unit and the pupil diameter estimated by the pupil diameter estimation unit; and
   a controller configured to output control information for controlling one of an image device and a display device, to increase the luminance of at least one display region focused on by the driver of an image of surroundings of a vehicle taken by the image device and displayed by the display device, based on the pupil diameter difference when the pupil diameter difference indicates that the driver is focused on a dim portion of the at least one display region.

2. The luminance control device according to claim 1, further comprising a sight line calculation unit configured to calculate a sight line of the driver,
   wherein the controller determines that a dim portion is being focused on, when the pupil diameter difference indicates that the dim portion is being focused on and the sight line of the driver is directed to the at least one display region in which the image of the surroundings of the vehicle is displayed.

3. The luminance control device according to claim 1, wherein the controller determines that the dim portion is being focused on, when the pupil diameter difference is more than a predetermined threshold value.

4. The luminance control device according to claim 1, wherein the controller restores the luminance of the at least one display region in which the image of the surroundings of the vehicle is displayed to an initial value, when the pupil diameter difference no longer indicates that a dim portion is being focused on.

5. The luminance control device according to claim 1, wherein the controller performs a feedback control for the one of the image device and the display device, until the pupil diameter difference falls within a predetermined range.

6. The luminance control device according to claim 2, wherein the controller controls a low luminance region including a viewing point in the at least one display region in which the sight line intersects.

7. The luminance control device according to claim 2, wherein the controller controls the display device having the at least one display region in which the sight line intersects so that luminance is increased.

8. The luminance control device according to claim 2, wherein the controller controls the image device for taking an image displayed in the at least one display region in which the sight line intersects so that luminance is increased.

9. The luminance control device according to claim 1, wherein the luminance estimation unit estimates the luminance of light incident on a pupil of the driver based on the luminance on the periphery of eyes of the driver.

10. The luminance control device according to claim 1, wherein the pupil diameter estimation unit generates the luminance corresponding relationship for the driver to estimate a pupil diameter for the driver.

11. A luminance control system, comprising:
    the luminance control device according to claim 1;
    a driver image device configured to image a driver's face;
    at least one of the image device configured to image surroundings of the vehicle; and
    at least one of the display device comprising the at least one display region for displaying the image taken by the at least one image device.

12. A method for controlling luminance, comprising:
    measuring a pupil diameter of a driver based on an image in which a driver's face is imaged;
    estimating luminance of light incident on a pupil of the driver based on the image;
    estimating a pupil diameter with respect to the luminance estimated according to a luminance corresponding relationship in which luminance is associated with the pupil diameter;
    calculating a pupil diameter difference that is a difference between the measured pupil diameter and the estimated pupil diameter; and
    outputting control information for controlling one of an image device and a display device, to increase the luminance of at least one display region focused on by the driver of an image of surroundings of a vehicle taken by the image device and displayed by the display device based on the pupil diameter difference when the pupil diameter difference indicates that the driver is focused on a dim portion of the at least one display region.

13. The luminance control device according to claim 1, wherein the luminance control device is for a vehicle and further comprises the image device disposed on the vehicle to image the vehicle surroundings.

14. The luminance control device according to claim 1, wherein the luminance control device is for a vehicle and wherein the controller controls the image device.

15. The luminance control device according to claim 1, wherein the luminance control device is for a vehicle and wherein the controller controls a diaphragm of the image device to increase the luminance of the at least one display region focused on by the driver of the image of surroundings of the vehicle taken by the image device and displayed by the display device.

* * * * *